Figure 3:
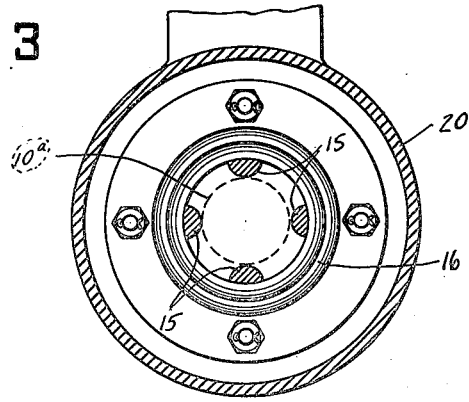

Oct. 6, 1936.  A. R. KENNEDY  2,056,526
METHOD OF PROCESSING CANNED PRODUCTS
Filed Jan. 24, 1935  2 Sheets-Sheet 1
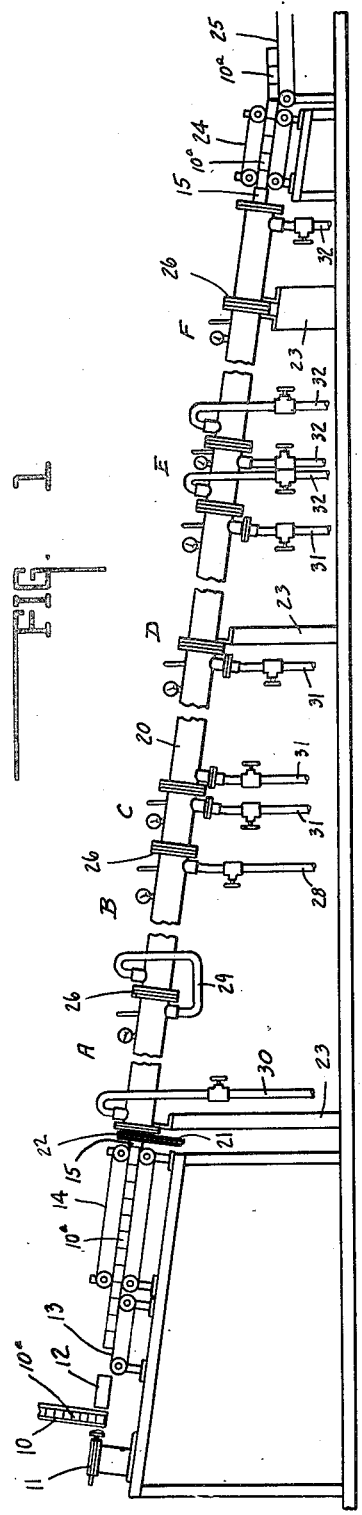
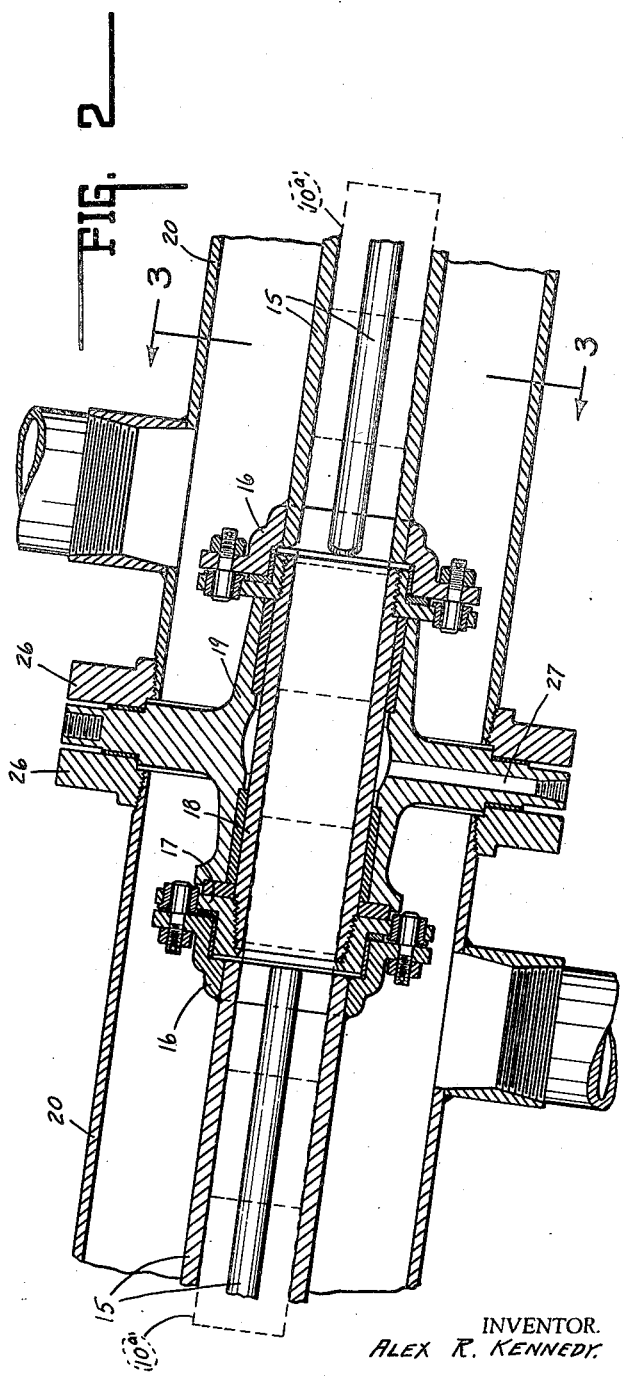
INVENTOR.
ALEX R. KENNEDY.
BY Lockwood Goldsmith & Galt
ATTORNEYS.

Oct. 6, 1936.  A. R. KENNEDY  2,056,526
METHOD OF PROCESSING CANNED PRODUCTS
Filed Jan. 24, 1935    2 Sheets-Sheet 2

INVENTOR.
ALEX R. KENNEDY.
BY Lockwood Goldsmith & Galt
ATTORNEYS.

Patented Oct. 6, 1936

2,056,526

UNITED STATES PATENT OFFICE 2,056,526

METHOD OF PROCESSING CANNED PRODUCTS

Alex R. Kennedy, Indianapolis, Ind., assignor to Indiana Condensed Milk Company, Indianapolis, Ind., a corporation Application January 24, 1935, Serial No. 3,211

9 Claims. (Cl. 53—20)

This invention relates to a method of processing products such as foods and beverages as ordinarily preserved in tin cans or other containers wherein the processing resides in the application of heat and its removal.

It is the principal object of the invention to produce canned foods of finer quality and taste than heretofore has been possible by known methods and apparatus. Furthermore, it is the object to effect the processing with a saving of time and heat units over that heretofore required.

Wherein the method as hereinafter more specifically described is applied to the processing of evaporated milk, one of the important advantages herein lies in the elimination of the usual caramelized or burned flavor heretofore common and recognized as incident thereto. Thus, evaporated milk processed by this method, when diluted with water, results in a product comparing favorably with pasteurized milk used for drinking. Likewise, undiluted it may be used with cereal and fruits in the place of fresh cream with practically no different flavor or taste, because of the absence of the usual burnt or caramelized flavor. In short, it may be used in the place of fresh or pasteurized milk or cream for coffee, baby formulas, cooking and the like without destroying the proper food flavor, because of the absence of the usual evaporated milk taste. The same follows in respect to its color, wherein the darkish or burnt color common to the usual evaporated milk is absent, the evaporated milk processed in accordance herewith being more nearly that of unsterilized milk which has been concentrated to double richness. Milk produced by this process is suitable for the manufacture of ice cream because of its light color, uncaramelized flavor and viscous body. The viscosity of milk produced by this process is greater than that of the usual evaporated milk, and will remain so over a longer period of storage, at undesirable temperatures. Milk produced by this process will whip equally as well as whipping cream and better than ordinary evaporated milk.

Another advantage inherent in this method of processing resides in the fact that when tin cans are used they are not de-tinned, either at the time of processing or after prolonged aging, as are the tins in which the usual evaporated milk is processed. The tin plate in the inside of the cans remains as clean and bright after several months storage as when new, as distinguished from their being de-tinned during and after sterilization as with present methods. Likewise, the cans are practically free from scorched milk which usually is found on the inside of cans processed as heretofore.

This is accomplished by causing the canned product to pass, while being rapidly rotated, through a series of heating zones from one heating or cooling zone directly to another, the heating or cooling zones being of different regulated temperatures. The duration of movement of the cans through each zone can thereby be minutely regulated and the speed of rotation of the cans can be controlled, whereby at a predetermined speed of rotation, each can may be subjected to a predetermined critical temperature through a specific and predetermined duration, changing from one temperature to the other without delay.

By reason of the high rate of speed permissible and the resultant rapid heat transfer and by reason of the relatively higher temperatures used on each individual product, it is possible to complete the processing in a much shorter time than heretofore. The invention may, therefore, be characterized as a method involving high temperature, short time and high speed, resulting in retaining the original flavor, color and aroma of the product.

It is common knowledge that in the processing of evaporated milk, high temperatures for prolonged periods of time cause changes in the color, flavor and viscosity of the product. The first two factors mentioned are undesirable changes while the latter one, or the development of viscosity, is essential to the manufacture of a superior product. The changes of flavor and color are due to chemical changes in the protein and to caramelization of the lactose. These changes are effected by increased temperatures and by increased duration of exposure at like temperatures, but of the two, the time of exposure has considerably more effect upon the degree of caramelization.

It is also common knowledge that in the processing of evaporated milk, high temperatures for prolonged periods cause thickening of the product and ultimately a separation of the curd or coagulation. One theory is that this thickening is due to the hydration of the casein molecule upon the release of calcium into the serum. This hydration causes swelling of the casein molecule which in turn causes thickening of the product by increasing the percentage volume of the suspended phase. This thickening is increased by increased temperatures and by increased periods of exposure at like temperatures. However, the speed of this reaction is more sensitive to increased temperatures than to increased time of exposure to like temperatures.

It is, therefore, logical that by increasing the temperature and shortening the time of exposure a point can be reached at which maximum viscosity can be obtained with minimum caramelization. The maximum viscosity referred to is that viscosity reached at a temperature, for a given period of exposure, a fractional degree Fahrenheit below that temperature at which coagulation occurs. This minutely accurate temperature control is absolutely essential because of the speed of the hydration and thickening at the high temperatures used. By this invention, I have made possible the accurate control of temperature necessary to the development of maximum viscosity without coagulation. As an incident to the above process, complete sterilization of the product takes place.

By the use of considerably higher temperatures in the processing of evaporated milk, the speed of the reaction causing thickening of the milk is increased. However, the use of the higher temperatures does not increase the speed of the reactions which cause color and flavor changes proportionately. Hence, by the use of higher temperatures and shorter times of exposure one is able to obtain greater viscosities with less caramelization. Also, because of the fact that the speed of caramelization is not increased proportionately as much as the speed of hydration or thickening by higher temperatures and shorter periods of exposure, one is able to reach the maximum viscosity of each particular milk whereas with the usual low temperature-long time process, the limiting factor is caramelization in some cases.

Figure 4:
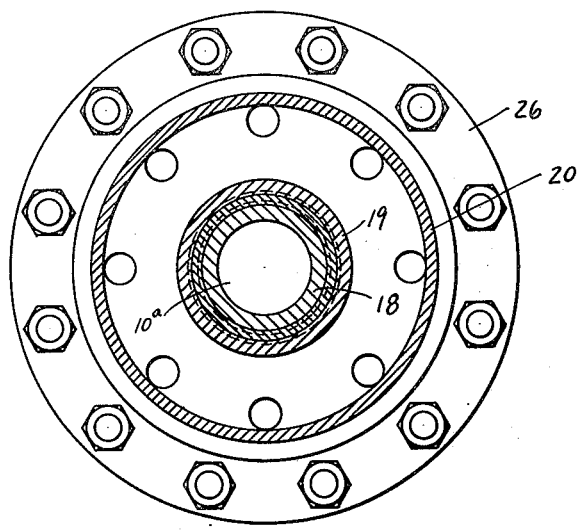

Other objects and features of the invention will be understood from the accompanying drawings and the following description and claims:

Fig. 1 is a diagrammatical illustration of the apparatus showing a side elevation. Fig. 2 is an enlarged central vertical section through one of the couplings and bearing supports. Fig. 3 is a section taken on the line 3—3 of Fig. 2. Fig. 4 is the same as Fig. 3 viewed through a modified form of coupling and bearing support perforated for permitting communication between sections of one zone.

For example, the method and apparatus herein specifically described for carrying it into effect is more particularly applied to processing evaporated milk, various modifications coming within the scope of the invention being applicable to other and various canned foods, preferably of the liquid and semi-liquid type.

The apparatus shall first be described wherein there is diagrammatically illustrated the usual conveyor 10 along which the filled cans or containers 10a are conveyed with their axes extending transverse to the track or conveyor. Adjacent thereto there is the usual pusher 11 which pushes the can endwise to a tubular gauge 12 for the purpose of determining whether or not the can is of the proper diameter before it enters the processing apparatus. Those that are oversize, or irregular in shape are rejected. Having passed through the gauge 12, the can is received upon a feeder belt 13.

From the feeder belt 13 the cans are fed between endless belts 14 which frictionally grip and carry them to the processing apparatus, operating at a slower speed than the feeder belt 13 so that the cans are crowded one against the other with their ends abutting. The feeder 14 discharges the cans endwise and in abutment into the intake end of a rotating carrier 15 formed of four spaced rods.

The rods comprise the carrier and it is formed in a plurality of sections connected together by suitable bearings, as illustrated in Fig. 2. The opposite ends of the rods are supported by flanged collars 16 in spaced relation, said collars being secured to corresponding flanges 17 mounted at opposite ends to a sleeve 18, said sleeve being rotatably supported by the bearing 19 which in turn is mounted in a tubular casing 20. The sleeve 18 is of an inside diameter corresponding to that of the rods 15 so that the cans, upon sliding endwise between said rods, may freely pass through the sleeve 18 with as close a fit as possible.

From the foregoing, it will be noted that the cans 10a are pushed through the downwardly inclined carrier 15 from the intake end of the apparatus to the discharge end, said carried being supported at intervals by the sleeves 18 rotating in the bearings 19, the cans passing through said sleeves.

The carrier 15 is rapidly rotated at approximately 200 R. P. M. by a drive chain 21 driving a sprocket 22 at the intake end of the apparatus. The apparatus is supported at intervals upon legs 23. The discharge end of the carrier 15 permits the cans to be discharged into a retarding conveyor 24 which carries them to an offbearing conveyor 25 after having been duly processed.

The tubular casing 20 is divided into a plurality of processing zones indicated at A—F, inclusive. At the ends of each zone the casing is provided with flanges 26 between which the bearing support 19 is secured. The bearing support is provided with the usual channel 27 for conveying lubricant to the bearing surface of the sleeve 18. Said zones are separated by the bearing support 19 which acts as a stuffing box and is provided with the usual seals and end thrust washers to prevent leakage of water or steam therethrough, as illustrated in Fig. 2. However, wherever there is a bearing employed intermediate the zones,—as in zones D and E,—the bearing 19 is perforated to permit free passage of steam or water, as illustrated in Fig. 4.

The zones are of different lengths, as will be noted in Fig. 1 wherein the zones C and E are comparatively short while the zones D and F are quite long and the zones A and B are of intermediate lengths. Each zone is heated by means of steam or water brought to the desired temperature and is provided with the usual instruments comprising a thermometer and pressure gauge for indicating the exact temperature at a given pressure within the casing of the zone. For heating the interior of the casing within each zone, there are provided a plurality of feed pipes having suitable control valves. Thus, a pipe 28 introduces hot water into the casing 20 of the zone B, the water being by-passed through pipe 29 to the zone A and discharged through pipe 30, whereby the zones A and B will be maintained at a predetermined temperature. Pipes 31 are steam pipes leading to the zones C, D, and E, the pipes 31 introducing steam into the casing and corresponding pipes draining the condensate therefrom, said last-mentioned pipes extending from the other side of the casing directly behind the pipes 31. Pipes 32 are intake and outlet water pipes which feed and drain the zones E and F, the bearing connection 26 within the zone F being perforated, as shown in Fig. 4.

In operation, the cans are pushed through the casing at a predetermined speed end to end, each controlled by the relative speeds of the feeding belts 14 and retarding belts 24. The cans slide through the carrier 15 which is being rotated by the chain 21 at a high speed. As the cans thus move through the respective zones while rotating, they are subjected to a predetermined temperature maintained in each of said zones by a heat transfer medium, such as water or steam.

As the cans move through the sleeves 18, they completely fill them and prevent any substantial passage of water or steam therethrough so that while each zone is shut off and separated from each adjacent zone, the cans continuously move from one zone to the other while their rotation is maintained through the medium of said rotating sleeve.

In respect to the method of processing accomplished by the above-described apparatus, it will be noted that by means of rapid rotation of the cans, resulting in the agitation of the contents thereof, the heat transfer effected through the conductivity of the metal walls of the cans will be greatly facilitated so that the heat of the respective zones is rapidly transferred to or withdrawn from the contents of the cans. The speed of rotation may be readily controlled so that the rate of heat conductivity to the contents may be varied, depending upon the requirements.

The period of time during which each can is subjected to the temperature of the respective zones is controlled both by the length of the zone and the speed of travel of the cans therethrough as required by the character of the product. Thus, this factor is dependent roughly upon the length of the zone and more closely upon the speed at which the feeder 14 and retarding belt 24 are operated.

The temperature of each zone may be controlled independently of the other zones by the usual medium of valves in the delivery pipes which are manipulated in accordance with observations taken from the thermometers and pressure instruments, all as indicated in Fig. 1. For example, in the processing of evaporated milk, good results may be obtained by feeding the cans 10a through the rotating carrier at a predetermined speed, and having each zone of such length that between the length of each zone and a fixed speed of travel the cans will be subjected to the following temperatures for the following periods of time. It is to be noted, however, that the following example may be varied as to temperature and time duration with respect to the particular character of the evaporated milk being processed, and more particularly with respect to products other than evaporated milk.

While being violently agitated by continual rotation and movement, the cans continuously pass through zones A and B at a predetermined speed of travel for a period of about three minutes, said zones being heated to approximately 212°–230° Fahrenheit. After leaving zones A and B, they immediately pass into zone C, requiring about five seconds to pass therethrough, zone C being heated to a higher temperature, or approximately 265°–300° Fahrenheit. Zone D is of such length as to require a period of about two minutes and fifteen seconds for the cans to pass therethrough, during which time they are subjected to a slightly less temperature, said zone being heated to about 255°–290° Fahrenheit. The cans pass through zone E in only about five seconds, during which time the temperature is rapidly reduced, this zone being maintained at a temperature of approximately 60°–80° Fahrenheit. Zone F is of such length as to require approximately three minutes for the cans to pass through with a temperature maintained therein of approximately 70°–90° Fahrenheit.

Thus it requires only about eight minutes and twenty-five seconds for the cans to pass through the apparatus and be processed thereby. The above zone temperatures and time durations, the latter being controlled by the length of the zones and controlled speed of passage, will vary in many respects, depending upon the character of the particular product and other variables. While for a given product of given characteristics, the duration of passage through each zone and the temperature thereof is critical, such critical temperatures and periods are variable with the product and its characteristics.

Tabulating the above for convenience, the following table may be noted:

| | | ° F. |
|---|---|---|
| Zones—A and B | 3 minutes | at 212–230 |
| Zone—C | 5 seconds | at 265–300 |
| Zone—D | 2 minutes, 15 seconds | at 255–290 |
| Zone—E | 5 seconds | at 60– 80 |
| Zone—F | 3 minutes | at 70– 90 |

These sudden and substantial changes in temperature are made possible by the zoning method coupled with the rapid rotation and definite predetermined periods during which the cans are subjected to such temperatures. In this manner the milk may be subjected to a critical temperature for a period of time sufficient to thicken the evaporated milk but with a sudden change of temperature just before the milk coagulates. Thus, the advantages of the method may be said to lie in the ability to rapidly change from a critical temperature at the proper time. This results in obtaining the desired effect including sterilization and thickening without curdling, scorching or detinning the cans.

By reason of the rapid rotation permissible, as well as the higher temperatures, a greater speed of operation may result. Thus, a can may be rapidly processed by this method and apparatus whereas it has heretofore taken a much longer time. Also, a more rapid heat transfer over a shorter period of time has the desired effect of retarding undesired chemical changes by reason of the heat change occurring at the critical time and temperature.

Whereas the invention has been described particularly as applying to evaporated milk, any other products, such as canned foods and beverages, may be processed by the same method and apparatus, and wherein reference is made to canned products, such term includes bottled goods or the use of any other similar containers wherein the product is sealed.

The invention claimed is:

1. The method of processing canned products consisting in rapidly and continuously rotating the containers in which the products are contained about a common axis extending centrally thereof, passing the containers through a plurality of heating and cooling zones of different critical temperatures, said zones being of predetermined lengths through which the products are moved at a predetermined rate of speed, whereby said products will remain in each zone a given length of time.

2. The method of processing canned products consisting in passing them through a plurality of heating and cooling zones of predetermined lengths, the passage therethrough being at a speed to cause said products to remain in the respective zones for the desired duration of time, rapidly and continuously rotating the containers containing the products about a common axis extending centrally thereof during their movement, and maintaining the zones at different temperatures, at least one of which is of a high critical temperature for effecting the processing without scorching.

3. The method of processing canned products consisting in rapidly and continuously rotating the containers thereof about a common axis extending centrally thereof while passing them through a plurality of heating and cooling zones, one of which is maintained at a high critical temperature, each zone being such that, at constant travel therethrough, the products will be maintained at substantially the temperature thereof for a predetermined duration, whereby the products may be rapidly brought to a high critical temperature for a short time and rapidly cooled, thereby reducing the time required in said processing.

4. The method of processing canned products, consisting in sliding a plurality of containers in which the products are contained in longitudinal alignment through a plurality of heating and cooling zones of different critical temperatures, said zones being of predetermined lengths through which the containers are caused to slide at a predetermined rate of speed, and rapidly and continuously rotating said containers about their longitudinal axes during their sliding movement through the zones.

5. The method of processing canned products, consisting in feeding a plurality of containers in which the products are contained end to end through a plurality of heating and cooling zones of different critical temperatures, said zones being of predetermined lengths through which the containers are fed at a predetermined rate of speed whereby said products will remain in each zone a given length of time, and rapidly and continuously rotating said containers about a common axis extending centrally thereof.

6. The method of processing canned products, consisting in rapidly agitating the containers in which said products are contained, passing the containers through a plurality of heating and cooling compartments in which different critical temperatures are maintained, said compartments being of predetermined lengths through which the containers are passed at a predetermined rate of speed, whereby said products will remain in each compartment a given length of time, and sealing adjacent compartments from each other by the containers passing therebetween.

7. The method of processing canned products, consisting in sliding a plurality of containers in which the products are contained end to end through a plurality of heating and cooling compartments of different critical temperatures, said compartments being of predetermined lengths through which containers are moved at a predetermined rate of speed whereby said products will remain in each compartment a given length of time, rapidly and continuously rotating said containers about a common axis extending centrally thereof, and sealing the adjacent compartments from each other by the containers passing therebetween.

8. The method of processing canned products, consisting in feeding a plurality of containers in which the products are contained through a plurality of heating and cooling zones of different critical temperatures, said zones being of predetermined lengths through which the containers are fed at a predetermined rate of speed whereby said products remain in each zone a given length of time, and continuously rotating said containers about a common axis extending centrally thereof at approximately 200 R. P. M. for permitting of rapid heat transfer.

9. The method of processing canned products consisting in rapidly agitating the containers in which said products are contained, passing the containers through a plurality of heating and cooling compartments in which different critical temperatures are maintained, said compartments being of predetermined lengths through which the containers are passed at a predetermined rate of speed, whereby said products will remain in each compartment a given length of time, heating the first compartment to approximately 212 to 230 degrees Fahrenheit through which the containers pass in approximately three minutes, heating the next compartment to approximately 265 to 300 degrees Fahrenheit through which the containers pass in approximately five seconds, heating the next compartment to approximately 255 to 290 degrees Fahrenheit through which the containers pass in approximately two and one-fourth minutes, heating the next compartment to approximately 60 to 80 degrees Fahrenheit through which the containers pass in approximately five seconds, and heating the next compartment to approximately 70 to 90 degrees Fahrenheit through which the containers pass in approximately three minutes.

ALEX R. KENNEDY.